United States Patent
Lapeyre

(10) Patent No.: US 8,028,618 B2
(45) Date of Patent: Oct. 4, 2011

(54) COOKER APPARATUS AND METHOD

(75) Inventor: Robert S. Lapeyre, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 423 days.

(21) Appl. No.: 12/393,897

(22) Filed: Feb. 26, 2009

(65) Prior Publication Data

US 2010/0212514 A1    Aug. 26, 2010

(51) Int. Cl.
*A23L 3/00*   (2006.01)
*A23N 12/00*   (2006.01)

(52) U.S. Cl. ......... 99/443 R; 99/443 C; 99/477; 99/516; 198/493; 198/494

(58) Field of Classification Search ................ 99/443 R, 99/443 C, 473, 474, 477, 478, 516; 198/493, 198/494, 498, 499, 853
See application file for complete search history.

(56) References Cited

U.S. PATENT DOCUMENTS

| | | | |
|---|---|---|---|
| 1,148,005 A | 7/1915 | Bogdanffy | |
| 3,583,555 A * | 6/1971 | Karsnak et al. | 198/495 |
| 3,860,105 A | 1/1975 | Johnson | |
| 4,706,336 A | 11/1987 | Hartmann et al. | |
| 4,735,817 A | 4/1988 | Smith | |
| 4,942,810 A * | 7/1990 | Zittel et al. | 99/477 |
| 4,966,072 A | 10/1990 | Ellis-Brown | |
| 5,077,072 A | 12/1991 | Sieradzki | |
| 5,161,666 A * | 11/1992 | Pope | 198/498 |
| 5,410,951 A * | 5/1995 | Ledet et al. | 99/443 C |
| 5,497,872 A * | 3/1996 | Pennino | 198/498 |
| 5,570,626 A * | 11/1996 | Vos | 99/404 |
| 5,615,606 A * | 4/1997 | Vos | 99/352 |
| 5,657,853 A * | 8/1997 | Pennino | 198/499 |
| 5,666,876 A * | 9/1997 | Vos | 99/443 C |
| 5,931,084 A | 8/1999 | Blanga | |
| 7,069,841 B2 * | 7/2006 | Ledet et al. | 99/386 |
| 7,179,160 B2 | 2/2007 | Hulin | |

FOREIGN PATENT DOCUMENTS

JP   57065168 A   4/1982

OTHER PUBLICATIONS

Laitram Machinery, Inc., "Model FC Cooker" brochure, copyright 2007, Laitram Machinery, Inc.

* cited by examiner

*Primary Examiner* — William Pierce
(74) *Attorney, Agent, or Firm* — James T. Cronvich

(57) ABSTRACT

A continuous cooker having a conveyor capable of repositioning product and cleaning itself of debris and a method for its operation. The cooker includes a conveyor that transports food atop a conveyor belt to a cooking chamber. Upper and lower diverting rollers guide the belt along an S-shaped product-repositioning path segment. The lower diverting roller is rotated at a speed different from the speed of the conveyor belt to cause the belt to slip on the roller's periphery, which effects a scraping action against the conveying side of the belt to dislodge debris.

22 Claims, 4 Drawing Sheets

COOKER APPARATUS AND METHOD

BACKGROUND

The invention relates generally to cooking apparatus, especially cookers cooking products conveyed on conveyor belts.

Cookers, such as steam cookers and blanchers, are often used to cook food products, such as shrimp. In continuous shrimp cookers, shrimp are conveyed through a steam-filled chamber on a conveyor belt. To uniformly cook the shrimp, which may sit on the conveyor belt in a thick layer, it is often necessary to reposition the shrimp one or more times along the belt's path through the cooking chamber. The conveyor belt is guided around an upper, forward roller and a lower, rearward roller in an S-shaped back flip along the conveying path. Shrimp drop off the upper portion of the belt winding around the upper roller and land on the lower portion of the conveyor belt exiting the lower roller. In this way, the shrimp are repositioned on the belt with previously unexposed portions exposed to the cooking steam. Such a repositioning flip for a flighted belt is described in U.S. Pat. No. 5,410,951, "Apparatus and Method for Continuous High-Volume Steam Cooking," May 2, 1995, to Ledet et al. In the Ledet cooker, the upper roller, a sprocket, and the lower roller, which has deep notches to accommodate the belt's flights, rotate at the same speed as the belt because they positively engage structure in the modular belt conveying the food products.

One problem not addressed by the Ledet cooker is the build-up of debris, such as shrimp whiskers, shell fragments, and slimy fluids on the conveying surface of the belt. Cookers similar to the Ledet cooker use idle rollers as the upper and lower rollers to provide a back flip for a flightless conveyor belt. A brake on the lower roller is periodically activated to halt its rotation so that the conveying surface of the belt slides on the braked roller to scrape off debris. But braking the lower roller puts an added load on the belt and its drive motor.

SUMMARY

A cooker embodying features of the invention cleans debris from a conveyor belt arranged to reposition products while transporting them through a cooking chamber. The conveyor conveys the products through an entrance at one end of the chamber and out an exit at the other end. The conveyor includes a powered conveyor belt advancing through the chamber along a conveying path. The conveyor belt has an outward-facing conveying side and an opposite non-conveying side. An upper diverting roller in the chamber has a periphery that engages the non-conveying side of the conveyor belt. A lower diverting roller is disposed in the cooking chamber below and closer to the entrance than the upper diverting roller. The periphery of the lower diverting roller engages the conveying side of the conveyor belt. The carryway path is diverted around the two diverting rollers along an S-shaped path segment, which effects product repositioning. A drive rotates the lower diverting roller at a speed different from the speed of the conveyor belt. The speed difference causes slip between the periphery of the lower diverting roller and the conveying side of the belt. The slip causes the lower diverting roller to scrape debris from the conveying side of the conveyor belt.

Another aspect of the invention provides a conveyor for scraping debris from a conveyor belt conveying products through and repositioning the conveyed products in a cooker. The conveyor comprises a powered conveyor belt having an outward-facing conveying side and an opposite non-conveying side advancing along a carryway path. The upper diverting roller along the carryway path has a periphery engaging the non-conveying side of the conveyor belt. A lower diverting roller is disposed below and behind the upper diverting roller along the carryway path. The lower diverting roller's periphery engages the conveying side of the conveyor belt. The carryway path is diverted around the upper and lower rollers along an S-shaped path segment so that conveyed products drop off the conveying side of the belt entering the S-shaped path segment around the upper diverting roller and land on the conveying side of the belt exiting the S-shaped path segment around the lower diverting roller. A drive rotates the lower diverting roller at a speed different from the speed of the conveyor belt. Slip between the periphery of the lower diverting roller and the conveying side of the conveyor belt causes the roller to scrape product debris from the conveying side of the belt.

In another aspect of the invention, a method for scraping debris from a conveyor belt conveying products through and repositioning the conveyed product in a cooker comprises: (a) advancing a conveyor belt around upper and lower diverting rollers defining an S-shaped path segment for a conveyor belt, wherein the upper diverting roller engages a non-conveying side of the conveyor belt and the lower diverting roller engages an opposite conveying side; and (b) overdriving the lower diverting roller to rotate at a speed greater than the speed of the conveyor belt.

BRIEF DESCRIPTION OF THE DRAWINGS

These aspects, features, and advantages of the invention are better understood by referring the following description, appended claims, and accompanying drawings, in which:

DETAILED DESCRIPTION

Figure 1:
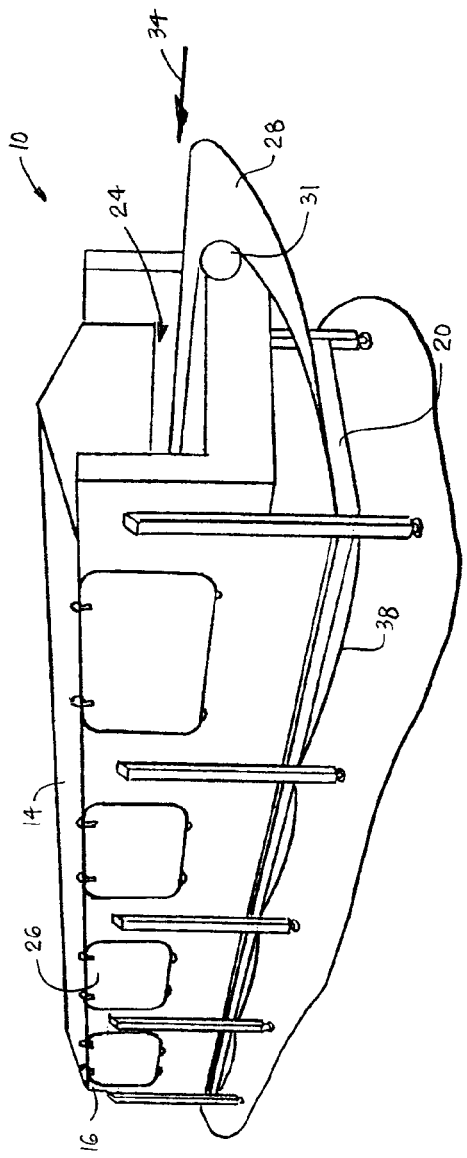
FIG. 1 is a perspective view of one version of a cooker embodying features of the invention.
Figure 2:
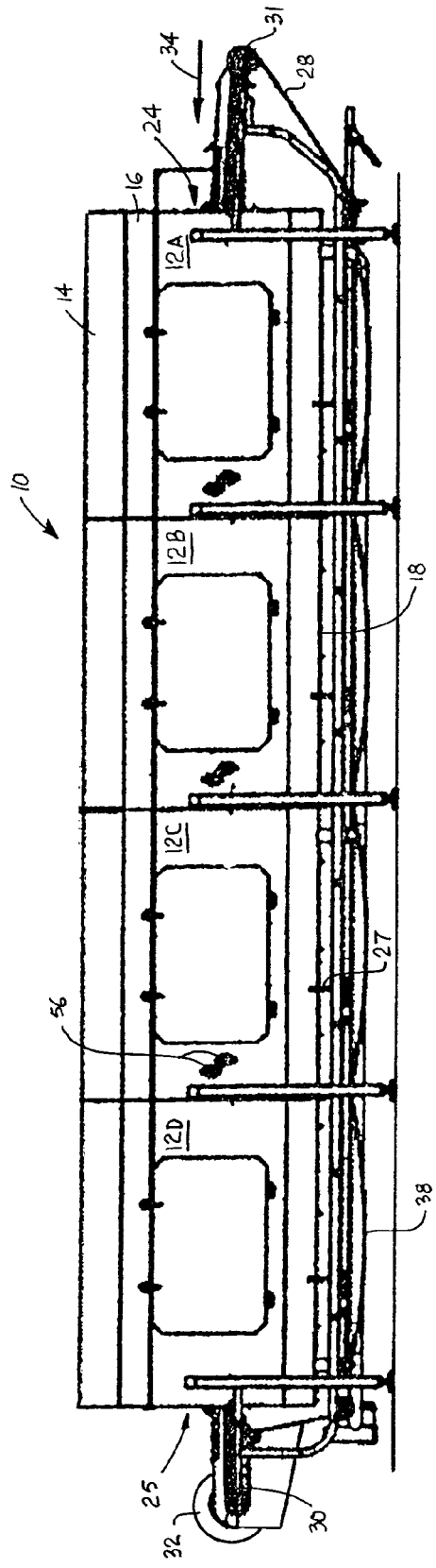
FIG. 2 is a side elevation view of one side of the cooker of FIG. 1.

A cooker embodying features of the invention is shown in FIGS. 1-4. The cooker 10 is constructed of modular sections 12A-12D, each having a roof 14, side walls 16, 17, and a bottom floor 18, supported in a frame 20. The modular sections are connected end to end to enclose an elongated cooking chamber 22 that is generally closed, except for entrance and exit ports 24, 25 at each end. Doors 26 on the side walls of each modular section permit access to the cooking chamber for maintenance, cleaning, and inspection. Steam or other cooking gases are released into the chamber via steam pipes 27 through the floors of the modular sections.

Shrimp, foodstuffs, or other products are transported into the cooking chamber atop a conveyor belt 28. The conveyor belt, which is preferably a foraminous modular plastic conveyor belt, is trained around main drive and idle sprockets 30, 31 just aft and fore of the chamber's exit and entrance. A drive motor 32 coupled to a drive shaft (not shown) on which the drive sprockets are mounted drives the conveyor belt into the cooking chamber through the entrance 24 and out the exit 25 in a conveying direction 34. Products on the conveyor are transported through the chamber 22 along a carryway path indicated generally by arrow 36 in FIG. 4. The belt returns from the drive sprockets to the idle sprockets 31 along a returnway path preferably located 38 outside the cooking chamber for easy access. Return rollers 40, or shoes, take up belt sag in the returnway. Tensioning rollers 42 are used to adjust the tension of the belt. The belt, sprockets, rollers, shafts, and motor constitute a cooker conveyor 43.

In the example cooker shown, the conveyor belt 28 undergoes three back flips 44 along the carryway path 36. Each back flip is enabled by a forward, upper diverting roller 46 and a lower, rearward diverting roller 48 positioned below and closer than the upper roller to the entrance 24 into the chamber. The upper and lower diverting rollers guide the conveyor belt along an S-shaped path segment 50 in the carryway path.

The periphery of the upper diverting roller 46 engages an inward-facing non-conveying side 52 of the conveyor belt. The periphery of the lower diverting roller engages an outward-facing conveying side 54 of the belt opposite the non-conveying side. Product riding atop the belt drops off the conveying side as the belt is diverted around each upper diverting roller and lands on the conveying side of the belt just after the belt's exit from the lower diverting roller at the end of the S-shaped path segment. The drop repositions product for more uniform exposure to the cooking medium.

Figure 4:
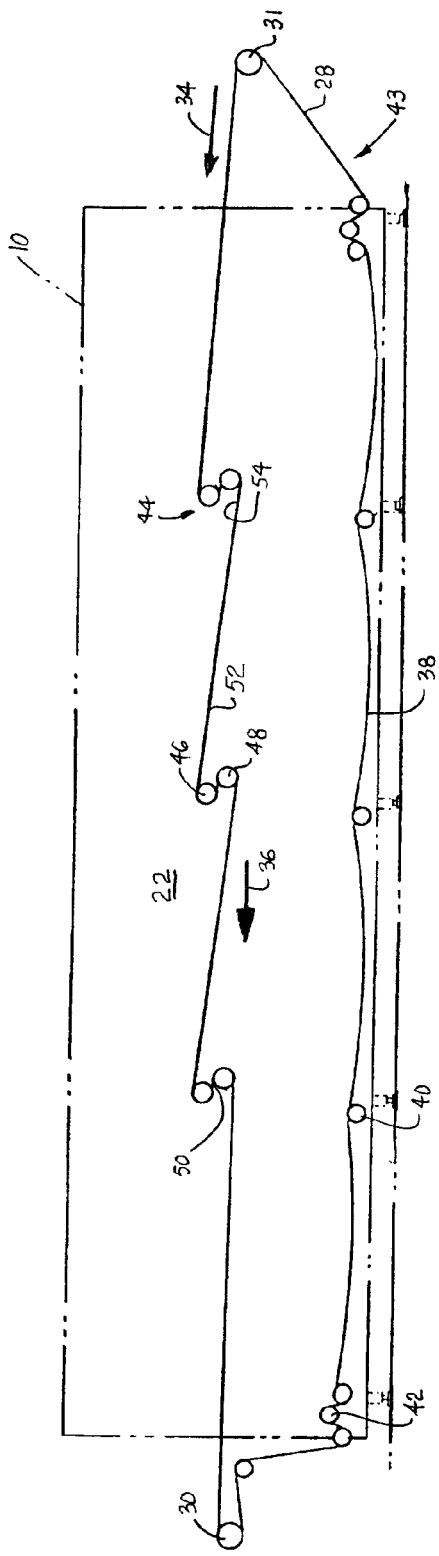
FIG. 4 is a side elevation schematic viewed from the same side as FIG. 2 illustrating the conveying path of the conveyor belt in the cooker of FIG. 1.

Each of the diverting rollers 46, 48 is supported in bearing blocks 56 mounted to the side walls 16, 17 of the modular sections. In this example, three of the modular sections (12A, 12B, and 12C) are virtually identical repositioning sections that include a back flip. The final section 12D is a standard section without a flip. As best shown in FIG. 4, the carryway path through each of the repositioning modular sections is slightly inclined leading into the back flip to compensate for the belt's drop in elevation at each back flip.

Figure 3:
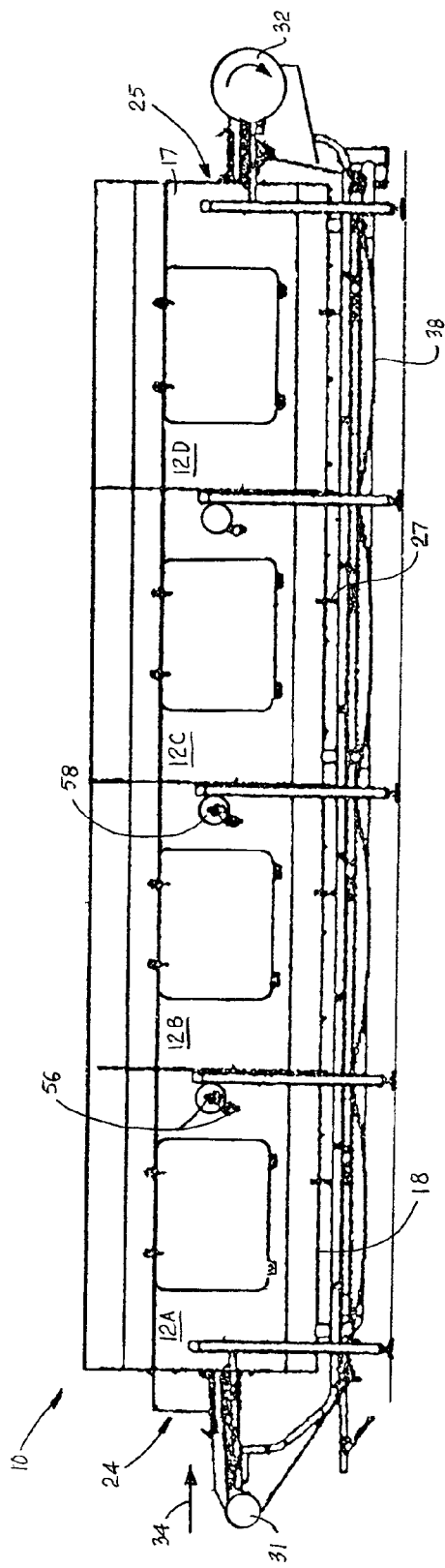
FIG. 3 is a side elevation view of the other side of the cooker of FIG. 1.
Figure 5:
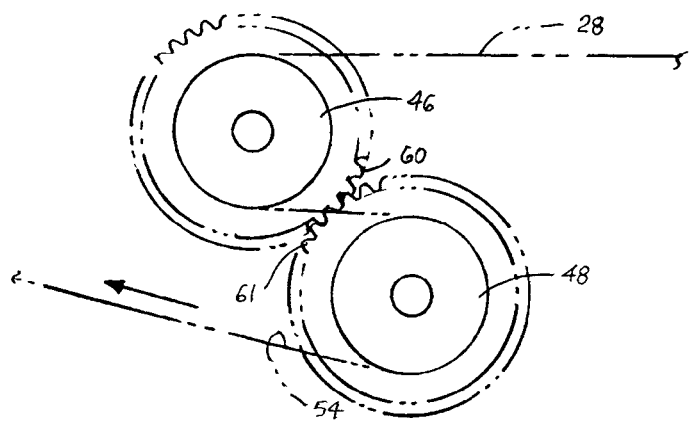
FIG. 5 is a side view of upper and lower diverting rollers in the cooker of FIG. 1.
Figure 9:
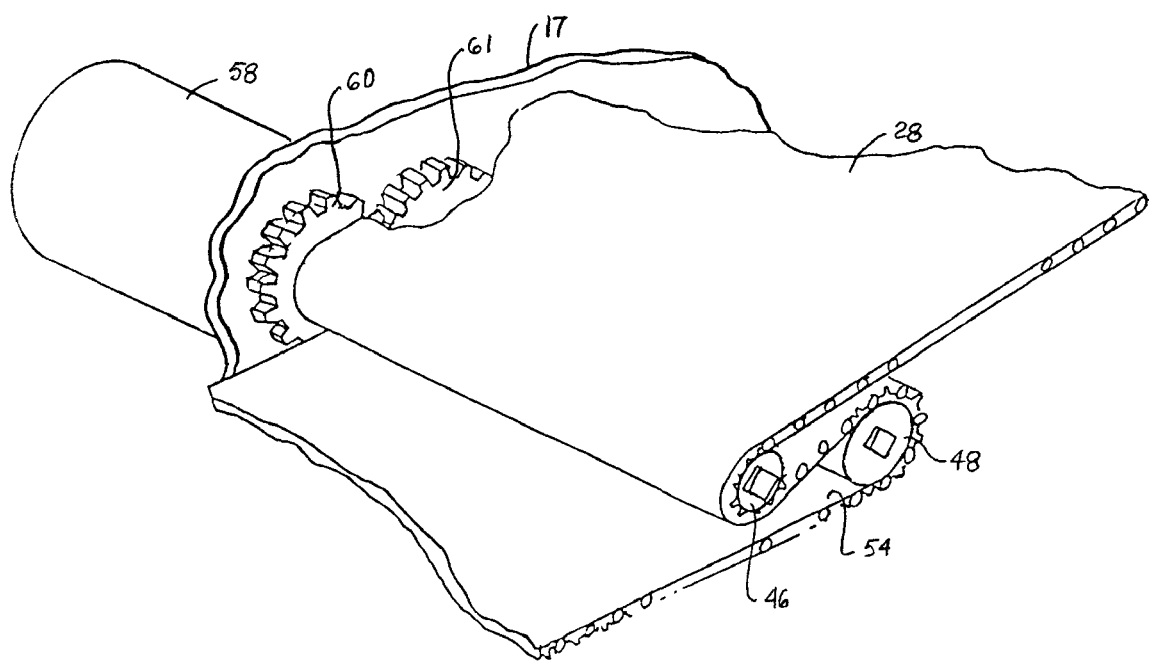
FIG. 9 is a fragmentary isometric view of a product repositioning portion of the conveyor in the cooker of FIG. 1.

As shown in FIGS. 3 and 9, a drive including a motor 58 is coupled to the upper and lower diverting rollers. As also shown in FIG. 5, the upper and lower diverting rollers 46, 48 have gears 60, 61 that mesh to rotate the linked rollers together. By driving the diverting rollers, the motors help reduce the load of the belt wound around the diverting roller on the main drive motor 32. If the diverting rollers are overdriven, i.e., rotated at a speed greater than the belt speed, the conveyor belt slips relative to the peripheries of the diverting rollers. The difference in speed between the lower diverting roller and the belt effects a sliding motion between the periphery of the roller and the conveying side 54 of the belt that scrapes debris off the belt.

Figure 6:
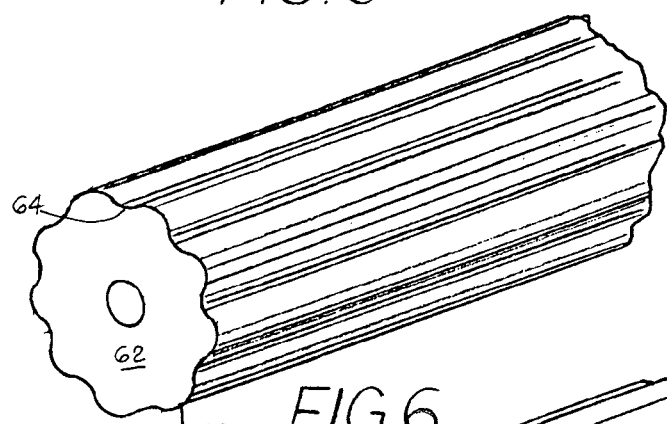
FIG. 6 is a fragmentary isometric view of one version of a diverting roller usable in a cooker as in FIG. 1.
Figure 7:
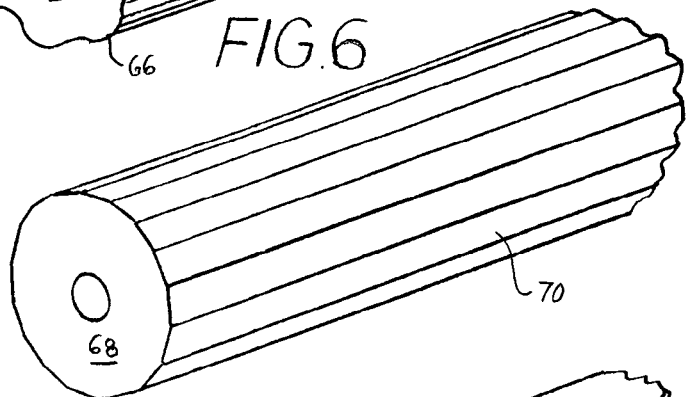
FIG. 7 is a fragmentary isometric view of another version of a diverting roller usable in a cooker as in FIG. 1.
Figure 8:
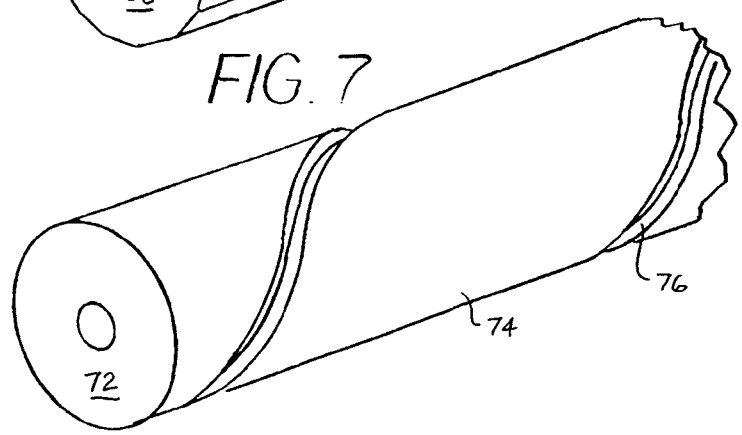
FIG. 8 is a fragmentary isometric view of yet another version of a diverting roller usable in a cooker as in FIG. 1.

The diverting rollers shown in FIGS. 5 and 9 both have circular cylindrical peripheries. But the periphery of the lower diverting roller is more effective at scraping off debris and helping drive the belt with a variegated surface, such as one of those example surfaces shown in FIGS. 6-8. The diverting roller 62 in FIG. 6 has a series of alternating axial grooves 64 and ridges 66 circumferentially spaced around its periphery. The diverting roller 68 in FIG. 7 has a polygonal periphery 70. And the diverting roller 72 in FIG. 8 has a circular cylindrical periphery 74 with a helical groove 76 cut into it. These are just three examples of variegated peripheral surfaces that may be used on the peripheries of the lower diverting roller to enhance cleaning and overdriving of the belt.

Although the invention has been described in detail with reference to a few preferred versions, other versions are possible. For example, the upper diverting roller could be an idle roller not linked by gears to the lower diverting roller or driven by a motor. In that case, the motor would be coupled directly and only to the lower diverting roller. As another example, the peripheries of the diverting rollers can be different. As yet another example, the lower diverting roller could be driven at a slower speed than the belt to effect the scraping action to clean the conveying side of the belt, but without the benefits of overdrive. So, as these few examples suggest, the scope of the claims should not be limited to the details of the versions described by way of example.

What is claimed is:

1. A cooker comprising:
   a cooking chamber having an entrance at one end and an exit at an opposite end;
   a conveyor conveying products through the cooking chamber, the conveyor including:
   a powered conveyor belt having an outward-facing conveying side and an opposite non-conveying side advancing through the entrance and out the exit along a carryway path through the cooker;
   an upper diverting roller disposed in the cooking chamber and having a periphery engaging the non-conveying side of the conveyor belt;
   a lower diverting roller disposed in the cooking chamber below and closer to the entrance than the upper diverting roller and having a periphery engaging the conveying side of the conveyor belt;
   wherein the carryway path is diverted around the upper and lower diverting rollers along an S-shaped path segment;
   a drive rotating the lower diverting roller at a speed different from the speed of the conveyor belt to cause slip between the periphery of the lower diverting roller and the conveying side of the conveyor belt.

2. A cooker as in claim 1 wherein the drive rotates the lower diverting roller at a speed greater than the speed of the conveyor belt.

3. A cooker as in claim 1 wherein the drive further rotates the upper diverting roller.

4. A cooker as in claim 3 wherein the drive rotates the upper diverting roller at a speed greater than the speed of the conveyor belt.

5. A cooker as in claim 1 further comprising a gear linking the upper diverting roller and the lower diverting roller.

6. A cooker as in claim 1 further comprising a plurality of pairs of upper and lower diverting rollers diverting the carryway path along S-shaped segments at spaced apart positions along the cooking chamber.

7. A cooker as in claim 1 wherein the conveyor belt follows a returnway path from the exit back to the entrance that lies outside the cooking chamber.

8. A cooker as in claim 1 wherein the periphery of the lower diverting roller is grooved.

9. A cooker as in claim 1 wherein the periphery of the lower diverting roller includes ridges.

10. A cooker as in claim 1 wherein the periphery of the lower diverting roller is polygonal.

11. A conveyor for scraping debris from a conveyor belt conveying product through and repositioning the conveyed product in a cooker, the conveyor comprising:

a powered conveyor belt having an outward-facing conveying side and an opposite non-conveying side advancing along a carryway path;

an upper diverting roller disposed along the carryway path and having a periphery engaging the non-conveying side of the conveyor belt;

a lower diverting roller disposed along the carryway path below and behind the upper diverting roller and having a periphery engaging the conveying side of the conveyor belt;

wherein the carryway path is diverted around the upper and lower diverting rollers along an S-shaped path segment so that conveyed product drops off the conveying side of the conveyor belt entering the S-shaped path segment around the upper diverting roller and lands on the conveying side of the conveyor belt exiting the S-shaped path segment around the lower diverting roller;

a drive rotating the lower diverting roller at a speed different from the speed of the conveyor belt to cause slip between the periphery of the lower diverting roller and the conveying side of the conveyor belt to scrape product debris from the conveying side of the conveyor belt.

12. A conveyor as in claim 11 wherein the drive rotates the lower diverting roller at a speed greater than the speed of the conveyor belt.

13. A conveyor as in claim 11 wherein the drive further rotates the upper diverting roller.

14. A conveyor as in claim 13 wherein the drive rotates the upper diverting roller at a speed greater than the speed of the conveyor belt.

15. A conveyor as in claim 11 further comprising a gear linking the upper diverting roller and the lower diverting roller.

16. A conveyor as in claim 11 further comprising a plurality of pairs of upper and lower diverting rollers diverting the carryway path along S-shaped segments at spaced apart positions.

17. A conveyor as in claim 11 wherein the periphery of the lower diverting roller is grooved.

18. A conveyor as in claim 11 wherein the periphery of the lower diverting roller includes ridges.

19. A conveyor as in claim 11 wherein the periphery of the lower diverting roller is polygonal.

20. A method for scraping debris from a conveyor belt conveying product through and repositioning the conveyed product in a cooker, the method comprising:

advancing a conveyor belt around upper and lower diverting rollers defining an S-shaped path segment for the conveyor belt, wherein the upper diverting roller engages a non-conveying side of the conveyor belt and the lower diverting roller engages an opposite conveying side;

overdriving the lower diverting roller to rotate at a speed greater than the speed of the conveyor belt to scrape debris from the conveying side of the conveyor belt.

21. The method of claim 20 further comprising:

overdriving the upper diverting roller to rotate at a speed faster than the speed of the conveyor belt.

22. The method of claim 20 comprising:

engaging the conveying side of the conveyor belt with the periphery of the lower diverting roller having a variegated surface.

* * * * *